(12) United States Patent
Schultz et al.

(10) Patent No.: US 6,186,168 B1
(45) Date of Patent: Feb. 13, 2001

(54) PRESSURE REGULATOR

(75) Inventors: Garth J. Schultz, Oxford; Alan F. Evans, Jr., Rochester Hills, both of MI (US)

(73) Assignees: Veritek NGV, Corp, Troy; Ford Global Technologies, Inc., Dearborn, both of MI (US)

( * ) Notice: Under 35 U.S.C. 154(b), the term of this patent shall be extended for 0 days.

(21) Appl. No.: 09/314,756

(22) Filed: May 19, 1999

(51) Int. Cl.[7] .......................... G05D 16/02; G05D 16/10
(52) U.S. Cl. ..................... 137/505.11; 137/505.12; 137/505.25
(58) Field of Search ................ 137/505.25, 505.11, 137/505.28, 505.12

(56) References Cited

U.S. PATENT DOCUMENTS

| | | |
|---|---|---|
| 664,383 | 12/1900 | Claude et al. . |
| 903,134 | 11/1908 | Giron . |
| 1,734,514 | 11/1929 | Benson et al. . |
| 1,799,914 | 4/1931 | Lemoine et al. . |
| 2,294,432 | 9/1942 | Weidner . |
| 2,731,033 * | 1/1956 | Cable . |
| 2,793,504 | 5/1957 | Webster . |
| 2,987,570 | 6/1961 | Bluth . |
| 3,059,210 | 10/1962 | Luenberger . |
| 3,084,210 | 4/1963 | Bluth et al. . |
| 3,094,141 | 6/1963 | Maienknecht . |
| 3,109,882 | 11/1963 | Maltby . |
| 3,118,295 | 1/1964 | Poppel . |
| 3,164,308 | 1/1965 | Marcovitch et al. . |
| 3,211,175 * | 10/1965 | Replogle . |
| 3,352,963 | 11/1967 | Homrig . |
| 3,386,072 | 5/1968 | Chandler . |
| 3,520,989 | 7/1970 | Funk et al. . |
| 3,565,201 | 2/1971 | Petsinger . |
| 3,789,820 | 2/1974 | Douglas et al. . |
| 4,020,863 | 5/1977 | Fabish . |
| 4,173,986 | 11/1979 | Martin . |
| 4,458,108 | 7/1984 | Kashimoto et al. . |
| 4,481,969 | 11/1984 | Fallon et al. . |
| 4,489,700 | 12/1984 | van der Weide . |
| 4,520,838 | 6/1985 | Fisher et al. . |
| 4,561,465 | 12/1985 | Rogers . |
| 4,572,477 | 2/1986 | Phlipot et al. . |
| 4,599,487 | 7/1986 | Blank et al. . |
| 4,611,628 | 9/1986 | Pasternack . |
| 4,643,215 | 2/1987 | Phlipot et al. . |
| 4,655,246 | 4/1987 | Phlipot et al. . |
| 4,718,638 | 1/1988 | Phlipot et al. . |
| 4,723,567 | 2/1988 | Phlipot et al. . |
| 4,785,847 | 11/1988 | Steer et al. . |
| 4,791,957 * | 12/1988 | Ross .............................. 137/505.12 |
| 4,811,752 | 3/1989 | Lyons et al. . |
| 4,817,658 | 4/1989 | Lyons . |
| 4,820,889 | 4/1989 | Seghetti . |
| 4,858,583 | 8/1989 | Sonntag . |
| 4,887,638 * | 12/1989 | Hellquist et al. ............... 137/505.13 |
| 4,971,224 | 11/1990 | Scremin . |
| 5,009,249 | 4/1991 | Fisher et al. . |
| 5,026,026 | 6/1991 | Sever et al. . |
| 5,029,730 | 7/1991 | Kostecki et al. . |
| 5,088,622 | 2/1992 | Valy et al. . |
| 5,193,580 | 3/1993 | Wass et al. . |

(List continued on next page.)

Primary Examiner—Stephen M. Hepperle
(74) Attorney, Agent, or Firm—Brooks & Kushman P.C.

(57) ABSTRACT

A regulator for regulating outlet pressure of a fluid contained in a tank includes first and second pistons. The first piston is biased in a first direction and is movable against the bias when exposed to pressure in the tank. The second piston is biased in a second direction away from an end of the first piston, and the second piston is movable against the bias when exposed to the outlet pressure. The ends of the first and second pistons are separated by a first distance to allow the fluid to flow out of the tank, and the ends of the first and second pistons are positioned closer together than the first distance to inhibit flow out of the tank when the outlet pressure reaches a threshold.

35 Claims, 8 Drawing Sheets

U.S. PATENT DOCUMENTS

| | | |
|---|---|---|
| 5,197,671 | 3/1993 | Wass et al. . |
| 5,197,710 | 3/1993 | Wass et al. . |
| 5,330,031 | 7/1994 | Hill . |
| 5,341,844 | 8/1994 | Wass et al. . |
| 5,379,761 * | 1/1995 | Schuler . |
| 5,452,738 | 9/1995 | Borland et al. . |
| 5,458,151 | 10/1995 | Wass . |
| 5,495,865 | 3/1996 | Wass et al. . |
| 5,507,308 | 4/1996 | Chambonnet . |
| 5,566,713 | 10/1996 | Lhomer et al. . |
| 5,635,770 | 6/1997 | Evans, Jr. et al. . |
| 5,644,104 | 7/1997 | Porter et al. . |
| 5,651,477 | 7/1997 | Takahashi et al. . |
| 5,799,640 | 9/1998 | Sugimoto et al. . |
| 5,899,221 * | 5/1999 | Holt et al. ............ 137/116.5 |
| 6,061,762 | 3/2000 | Sirosh et al. . |

* cited by examiner

PRESSURE REGULATOR

TECHNICAL FIELD

This invention relates to pressure regulators, and more particularly to a pressure regulator for regulating the outlet pressure of gaseous fuel from a tank in an alternatively-fueled motor vehicle.

BACKGROUND ART

Alternatively-fueled motor vehicles, i.e. those which operate solely or partially on a fuel other than gasoline or diesel fuel, are proliferating. Many such alternate fuel vehicles use fuel injectors that draw fuel from a tank that stores the alternate fuel in a highly pressurized, normally gaseous state. It is known to use a pressure regulator to control fuel pressure supplied to the fuel injectors, wherein the pressure regulator attempts to maintain a constant outlet pressure as tank pressure varies and/or as fuel flow rate varies. Existing pressure regulators, however, are typically disposed remotely from corresponding tanks. Consequently, relatively heavy-duty, thick-walled fuel lines are required between a particular tank and pressure regulator. Furthermore, existing pressure regulators suffer either in that there is some rise or drop of outlet pressure (called droop) over the range of tank pressures and/or the range of flow rates, or in that they have to use multiple stages of pressure reduction. The latter are relatively complex, costly, and unreliable.

DISCLOSURE OF INVENTION

The present invention is a regulator for regulating outlet pressure of a fluid contained in a tank. The regulator comprises first and second pistons. The first piston is biased in a first direction and movable against the bias when exposed to pressure in the tank. The second piston is biased in a second direction away from an end of the first piston and movable against the bias when exposed to the outlet pressure. The ends of the pistons are separated by a first distance to allow the fluid to flow out of the tank, and are positioned closer together than the first distance to inhibit flow out of the tank when the outlet pressure reaches a threshold.

Accordingly, an object of this invention is to provide a regulator of the type described above which eliminates the need for high pressure fuel lines.

Another object of this invention is to provide a regulator of the type described above which provides a relatively constant outlet pressure as the tank pressure abates.

Another object of this invention is to provide a regulator of the type described above which accomplishes precision control of the output pressure in a single stage.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
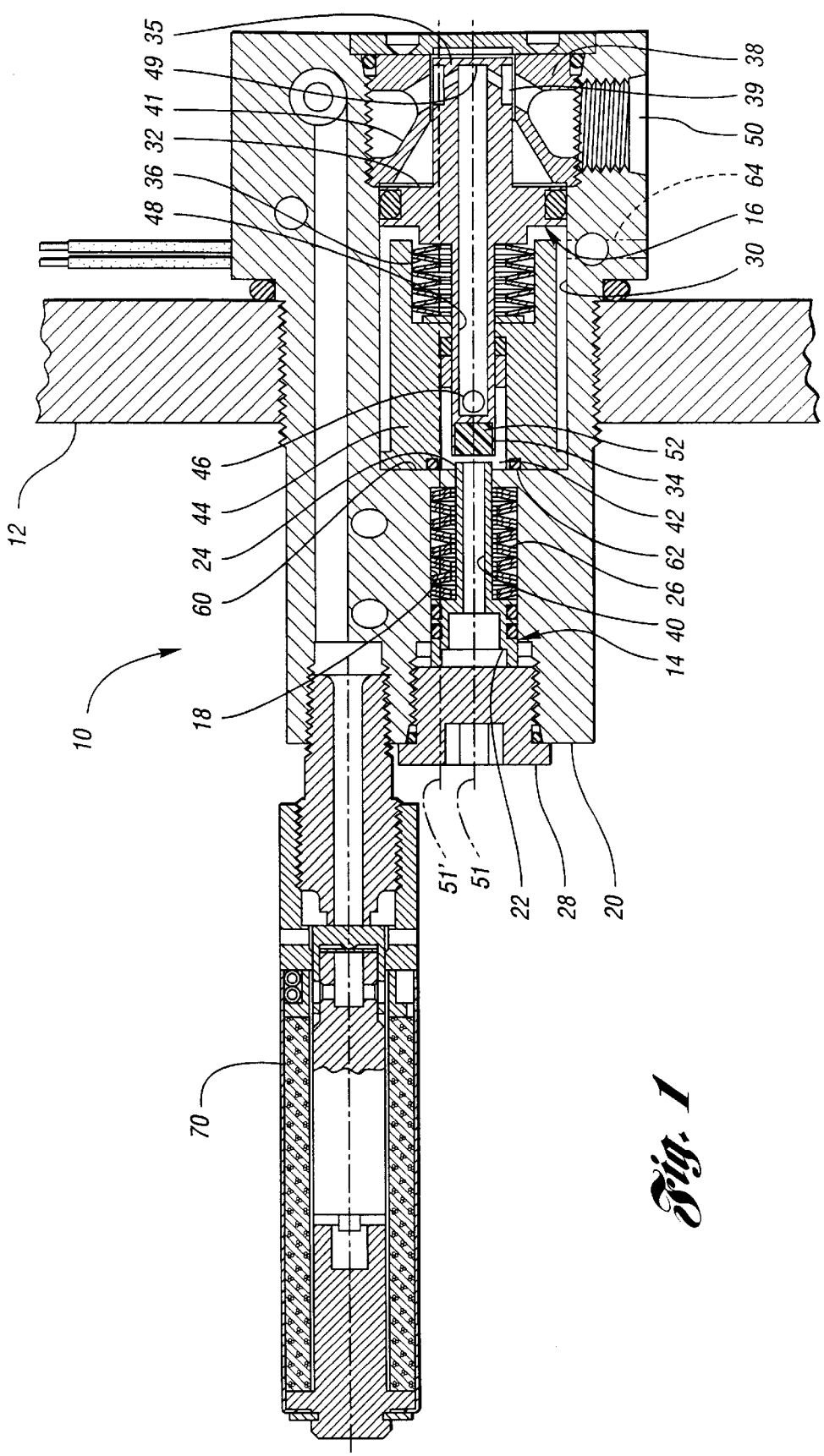
FIG. 1 is a side cross-sectional view of a pressure regulator according to the present invention in cooperation with an unpressurized tank.

With reference to the drawings, the preferred embodiments of the present invention will be described. FIG. 1 shows a pressure regulator 10 according to the present invention for regulating the outlet pressure of a fluid contained in a tank 12. In a preferred embodiment where the tank 12 is fitted in a vehicle, the fluid may for example be compressed natural gas, liquified natural gas, propane, or hydrogen. In other applications, the fluid may be for example carbon dioxide, oxygen or other commercial gases, or pressurized liquids. The regulator 10 comprises a first or compensation piston 14 and a second or main piston 16.

The compensation piston 14 is situated in a bore 18 in a body or block 20, and includes a head 22 and a distal end 24. A compensation spring 26 disposed in the bore 18 bears against the underside of the head 22, and normally biases the compensation piston 14 in a first, axial direction. In the condition shown in FIG. 1 where the tank 12 is unpressurized, the compensation spring 26 seats the compensation piston 14 against an end cap 28 threadingly engaged with the block 20.

The main piston 16 is situated in a bore 30 in the block 20, and includes a head 32, a distal end 34 and an extension 35. A main spring 36 disposed in the bore 30 bears against the underside of the head 32, and normally biases the main piston 16 in a direction away from, and preferably directly opposite from, the direction in which the compensation piston is biased. In the unpressurized condition shown in FIG. 1, the main spring 36 seats the head 32 of the main piston 16 against an end cap 38 threadingly engaged with the block 20, and aligns outlet ports 39 in the extension 35 in communication with a generally conical medial surface 41, and then to a single outlet 50. As shown in FIG. 1, the compensation piston 14 and the main piston 16 share a common axis 51. Furthermore, the axis 51 is offset from an axis 51' of the body 14.

Figure 2:
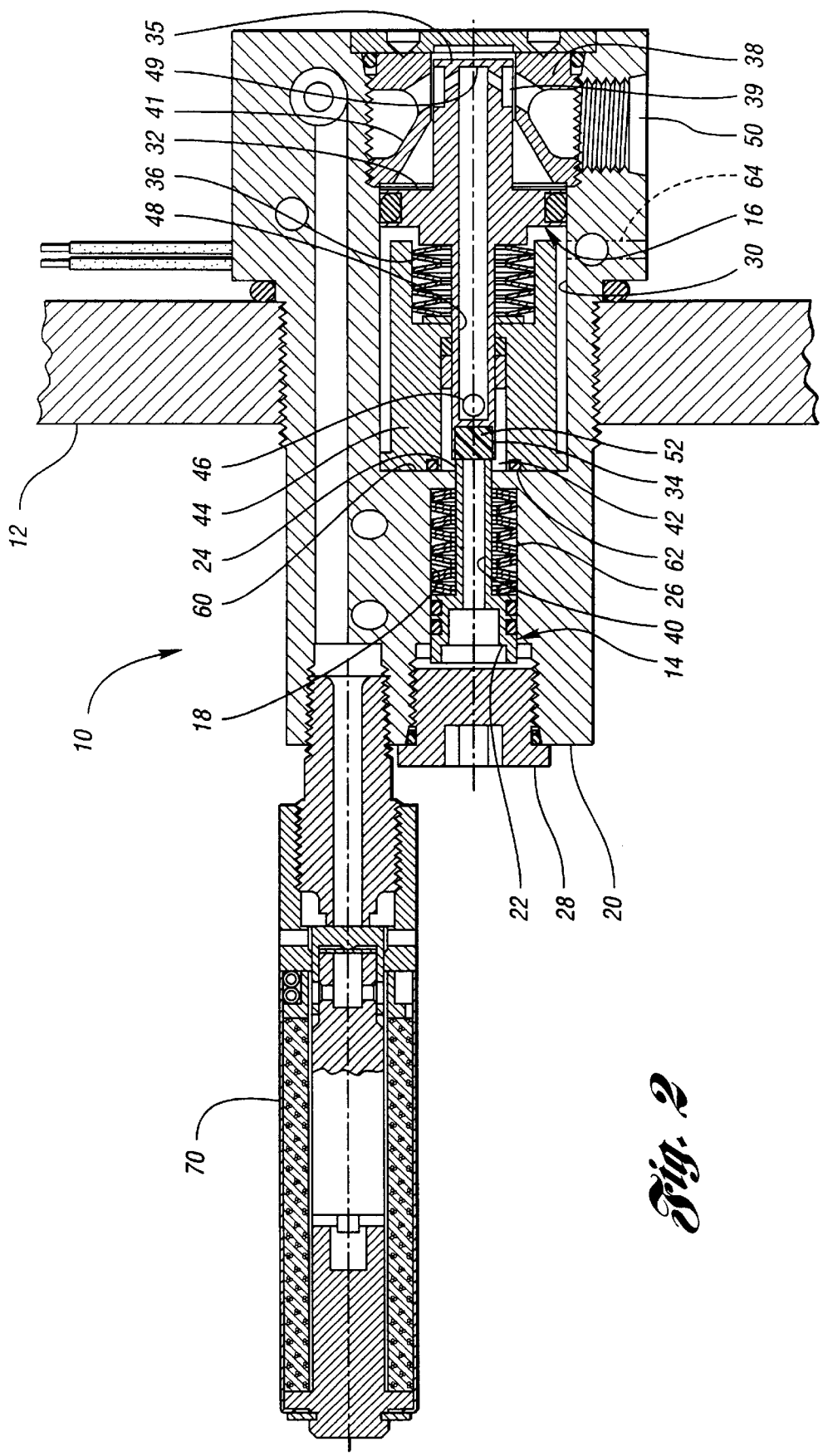
FIG. 2 is a side cross-sectional view of the pressure regulator and a pressurized tank.
Figure 3:
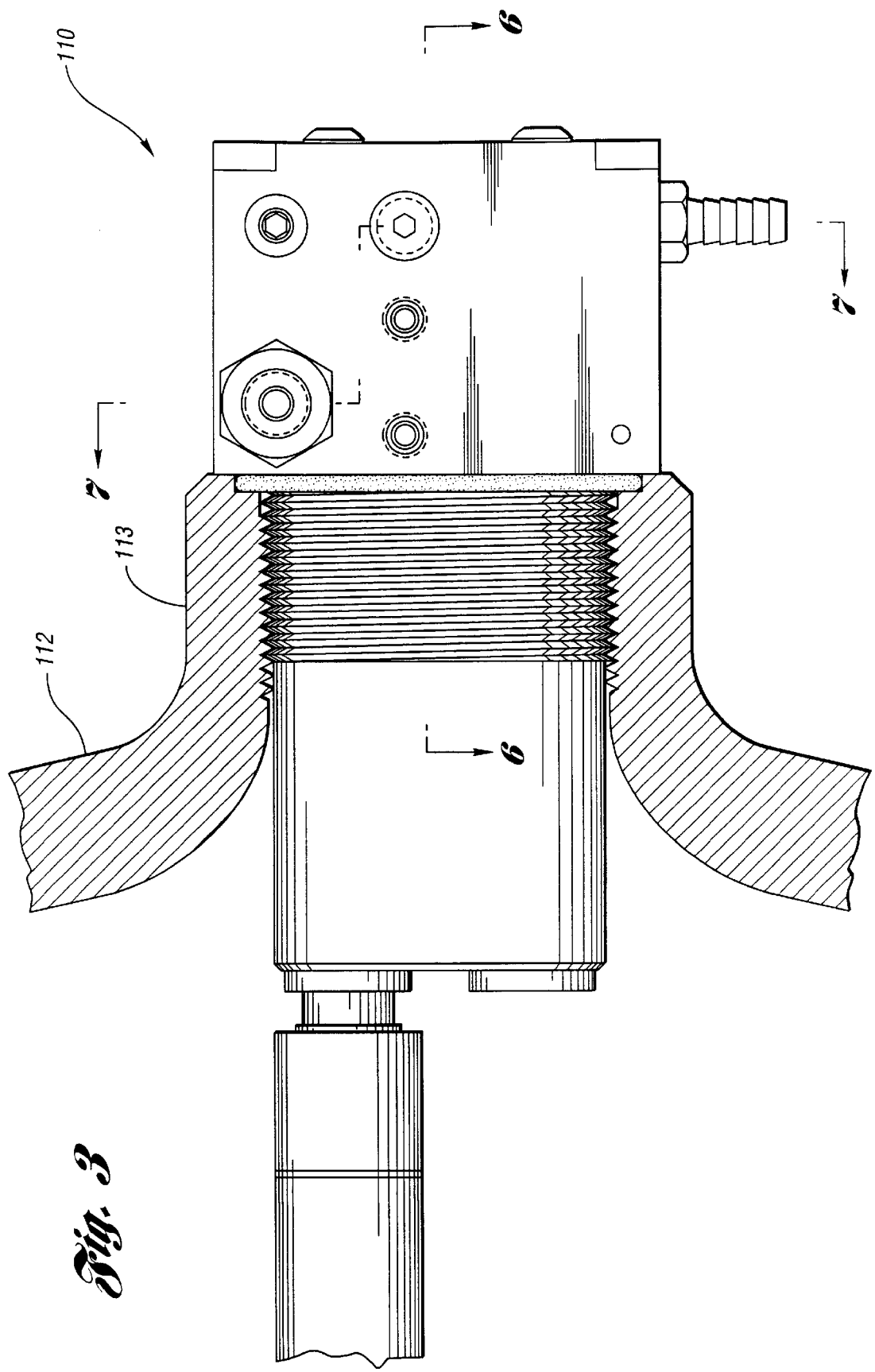
FIG. 3 is a side view of a second embodiment of the pressure regulator in cooperation with a pressurized tank, with the tank partially broken away to show the regulator.

FIG. 2 shows the tank 12 fully pressurized, typically for natural gas to a pressure in the range of about 3000–3600 pounds per square inch (psi). When the head 22 of the compensation piston 14 is exposed to pressure in the tank 12 through suitable passages in the regulator 10, the pressure acts on the effective cross-sectional area of the head 22 to move the compensation piston against the bias of the compensation spring 26 and compresses the compensation spring. In the preferred embodiment, the maximum stroke of the compensation piston 14 is in the range of about 0.055 inch to 0.063 inch, which is insufficient alone to stop the flow of fluid. This stroke changes dependent on the required output pressure, the fluid being regulated and the maximum inlet pressure. An axial bore 40 in the compensation piston 14 through which fluid may pass transmits the fluid into a chamber 42 defined in a tower 44. From the chamber 42, the fluid normally passes through one or more holes 46 in the main piston rod proximate the distal end 34, and through an axial bore 48 in the main piston 16 to impinge on an end 49 of the extension 35. This action contributes a dynamic force tending to add to the opening force developed by the main spring 36. Additionally, the end 49 diverts the flow of fluid at an angle greater than ninety degrees to its former axial flow, and over the conical surface 41. The flow over the conical surface 41 draws fluid away from the main piston head 32, thereby lowering the static pressure bearing against the main piston head 32, slightly diminishing the force tending to close the main piston 16.

These forces are factored in when selecting the springs 26 and 36. The springs 26 and 36 are preferably ratio-metric (i.e. the spring constants are proportional), and are chosen so that a constant outlet pressure is attained at the outlet 50 for normal flow rates and for normal operating tank pressures. In a natural gas vehicle, the target outlet pressure is normally about 100 psi for tank pressures of about 125–3600 psi. The outlet pressure, minus the loss created by the flow over the conical surface 41, acts on the head 32 of the main piston 16 to move it against the bias of the main spring 36. If the outlet pressure exceeds the desired value, the main piston 16 is driven toward the compensation piston 14 such that a thermoplastic seat 52 disposed in the distal end 34 of the main piston 16 mates with the distal end 24 of the compensation piston 14 to inhibit flow out of the tank. If the outlet pressure then drops below a threshold, as for example when a fuel injector might demand more fuel for delivery to an engine, the main piston 16 is biased away from the compensation piston 14, the ends of the pistons separate, and the flow of fuel out of the tank resumes. In the preferred embodiment, the main piston has a stroke in the range of about 0.005 to 0.01 inch at 3600 psi, and in the range of about 0.02 inch at 500 psi tank pressure.

The pressure regulator 10 thus provides precise control of output pressure without resorting to the use of multiple stages of pressure reduction. Because the pressure regulator 10 maintains a constant, relatively low outlet pressure, heavy-duty high pressure lines are not needed downstream of the outlet 50. Furthermore, because the pressure regulator 10 is mounted to the tank 12, the need for heavy-duty high pressure lines between the pressure regulator 10 and the tank 12 is eliminated.

The tower 44 normally mates with a surface 60 in the block 20 under the force of the main spring 36. An O-ring 62 situated in a groove in the tower seals the chamber 42. In the event that pressure in the chamber 42 exceeds a predetermined level, the tower 44 separates from the surface 60 and the excess pressure blows by the O-ring 62 and vents through a port 64 to the atmosphere.

The pressure regulator 10 can also be combined with other pressurized functions in a single manifold to reduce the system cost. Examples of this would be the addition of a high pressure solenoid 70, shown in FIGS. 1 and 2, to stop the flow of gas when de-energized. Other examples that may be added to the pressure regulator 10 in a single manifold either individually, or in any combination, include a cylinder pressure transducer or indicator, a pressure relief device, a cylinder temperature sensor, and an in-line filter.

FIGS. 3 through 7 show a second embodiment 110 of the pressure regulator that is partially mounted inside a tank 112 having a neck 113. The regulator 110 comprises similar components as the regulator 10, and functions in a manner similar to regulator 10 to regulate outlet pressure of a fluid contained in the tank 112. Similar to the regulator 10, the regulator 110 comprises a first or compensation piston 114 and a second or main piston 116.

The compensation piston 114 is situated in a bore 118 in a body or block 120, and includes a head 122 and a distal end 124. A compensation spring 126 disposed in the bore 118 bears against the underside of the head 122, and normally biases the compensation piston 114 in a first, axial direction toward an end cap 127. A seat 128 is movably attached to the distal end 124 of the compensation piston 114, and the seat 128 is movable between a first or unseated position, shown in FIG. 4, and a second or seated position, shown in FIG. 5. The seat 128 has a plurality of apertures or slots 129 for allowing fluid to flow therethrough when the seat 128 is in the unseated position. While the seat 128 may comprise any suitable material, the seat 128 preferably comprises a relatively hard thermoplastic material such as Vespel™, which is available from DuPont.

The main piston 116 is situated in bores 130 and 131 in the block 120, and includes a head 132 and a distal end 134. A main spring 136 disposed in the bore 131 bears against the underside of the head 132, and normally biases the main piston 116 in a direction away from, and preferably directly opposite from, the direction in which the compensation piston 114 is biased. The main piston 116 may also be provided with an extension, similar to the extension 35 of the main piston 16, for directing the flow of fluid in a manner similar to the regulator 10.

When the head 122 of the compensation piston 114 is exposed to pressure in the tank 112, the pressure acts on the effective cross-sectional area of the head 122 to move the compensation piston 114 against the bias of the compensation spring 126 to thereby engage the seat 128 with the distal end 134 of the main piston 116. The fluid may then pass through an axial bore 138 in the compensation piston 114, and then through the slots 129 in the seat 128 when the seat 128 is in the unseated position shown in FIG. 4. The fluid then passes through one or more holes 140 in the main piston 116, and through an axial bore 142 in the main piston 116. Next, the fluid is diverted at an angle to its former axial flow through a passage 144 and out an outlet 146 of the regulator 110.

Figure 4:
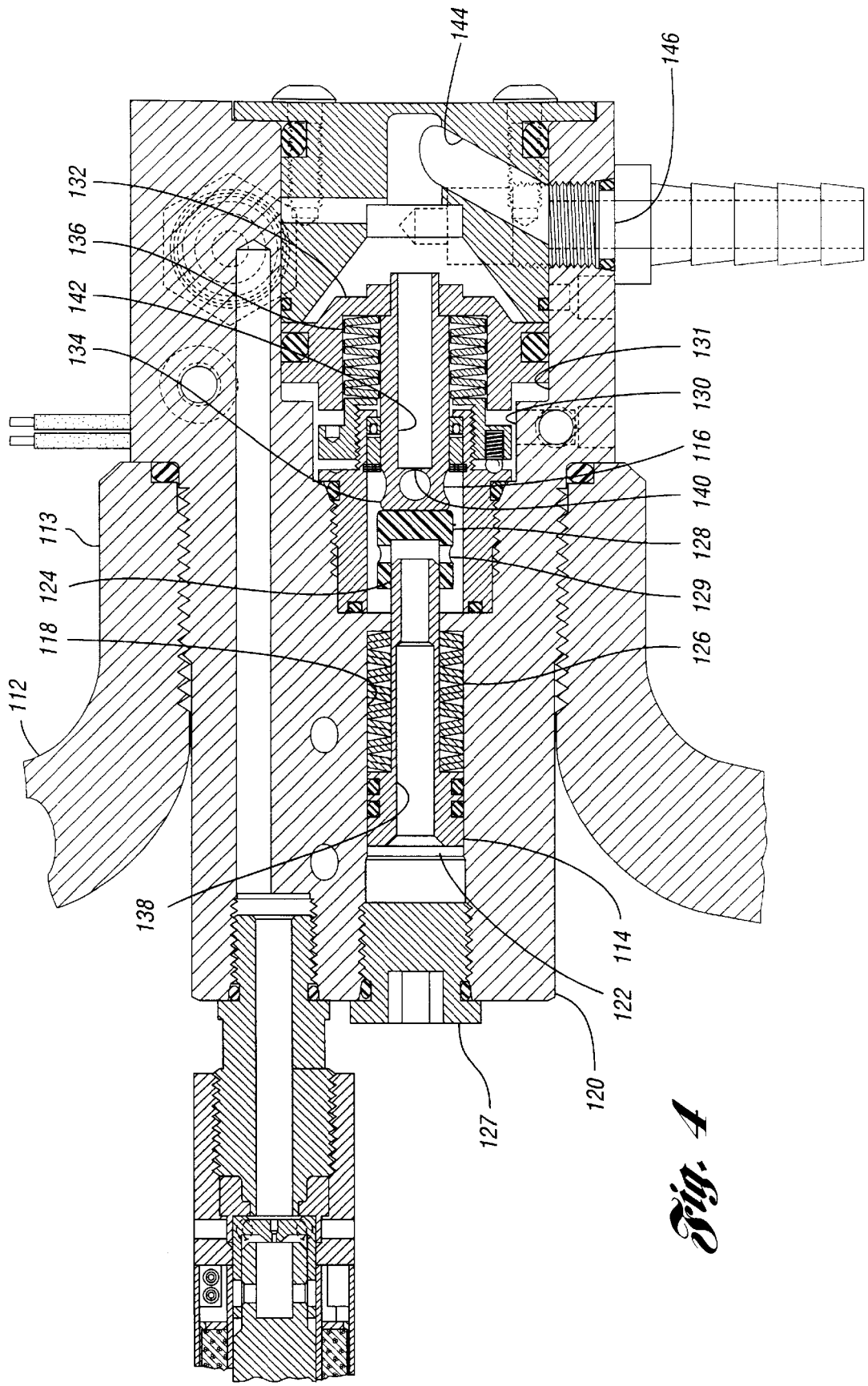
FIG. 4 is a side cross-sectional view of the pressure regulator of FIG. 3, wherein the pressure regulator includes a seat for controlling flow out of the tank, the seat being shown in an unseated position.
Figure 5:
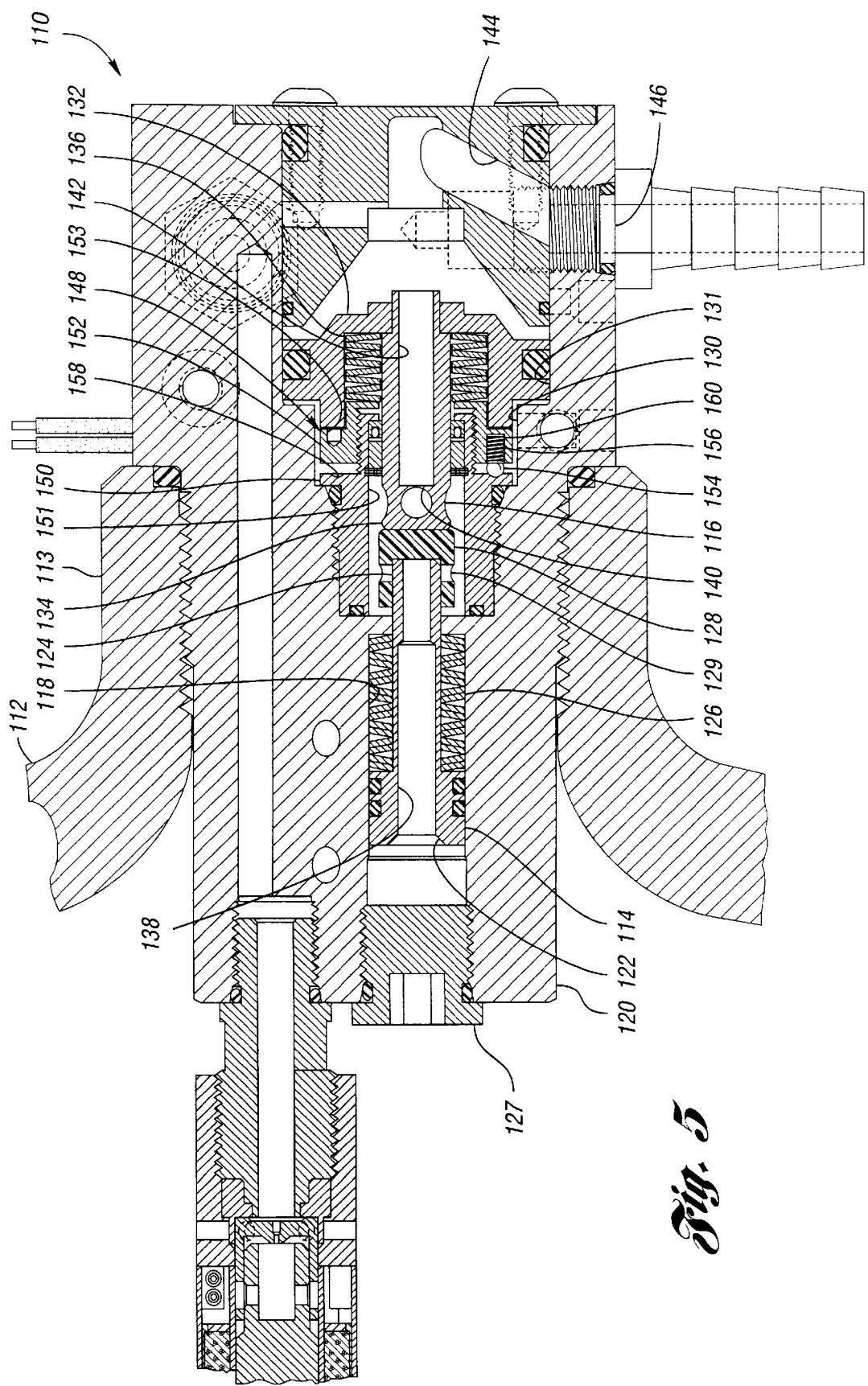
FIG. 5 is a side cross-sectional view of the pressure regulator of FIG. 3 with the seat shown in a seated position.

If the outlet pressure at the outlet 146 of the regulator 110 exceeds a desired value, the main piston 116 is driven toward the compensation piston 114, in a manner similar to the regulator 10, such that the main piston 116 moves the seat 128 to the seated position, as shown in FIG. 5, to thereby inhibit flow out of the tank 112. Furthermore, if the outlet pressure then drops below a threshold, the main piston 116 is biased away from the compensation piston 114, the seat 128 is biased to the unseated position shown in FIG. 4 by pressure in the tank 112, and the flow of fluid out of the tank 112 resumes. It should be noted that when tank pressure is applied to the regulator 110, the seat 128 preferably remains engaged with the distal end 134 of the main piston 116 at both the seated and unseated positions.

As shown in FIG. 5, the regulator 110 further comprises a pressure adjustment assembly 148 for adjusting the outlet pressure at the outlet 146. The pressure adjustment assembly 148 includes a tower 150, which is threadingly engaged with the block 120 and defines a chamber 151. The pressure adjustment assembly 148 further includes an adjustment collar or ring 152 threadingly engaged with the tower 150. The adjustment ring 152 may be rotated relative to the tower 150 by using a hook (not shown), or other suitable device, that is insertable through a port (not shown) in the regulator 110, and engageable with one or more notches 153 in the adjustment ring 152. Rotation of the adjustment ring 152 in a one direction increases pre-loading on the main spring 134, such that a greater outlet pressure is required to bias the main piston 116 toward the compensation piston 114 to thereby inhibit flow out of the tank 112. Thus, rotation of the adjustment ring 152 in such a manner increases the outlet pressure at the outlet 146. Similarly, rotation of the adjustment ring 152 in an opposite direction decreases the outlet pressure at the outlet 146.

The pressure adjustment assembly 148 further includes an engaging member such as a steel ball 154 that is slidably disposed in a channel 156 in the adjustment ring 152. The ball 154 is engageable with one or more recesses 158 in the tower body 150, and the ball is biased toward the tower 150 by a spring 160 that is also disposed in the channel 156. When engaged with one of the recesses 158, the ball 154 inhibits rotation of the adjustment ring 152 relative to the tower 150, thereby maintaining the adjustment ring 152 in a desired position.

Figure 6:
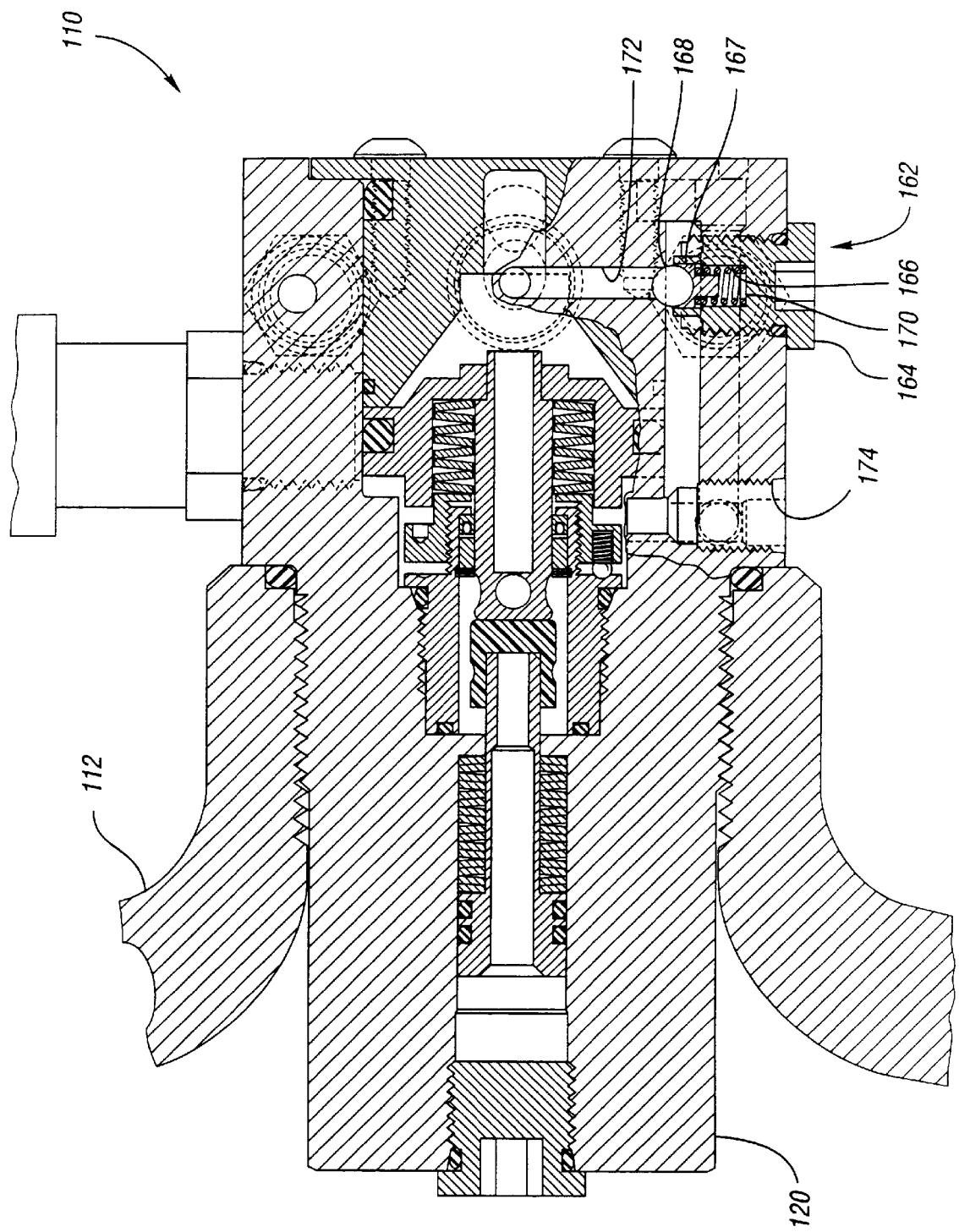
FIG. 6 is a sectional view of the pressure regulator of FIG. 3 taken along line 6—6 of FIG. 3, with a portion of the pressure regulator broken away to show a pressure relief valve assembly.

FIG. 6 shows a pressure relief valve assembly 162 for relieving pressure from the regulator 110. The valve assembly 162 includes a valve body 164 having a channel 166. A cup 167 is slidably disposed in the channel 166, and a TEFLON™ ball 168 is engaged with the cup 167. The valve assembly 162 further includes a pressure relief spring 170 disposed in the channel 166 and engaged with the cup 167. The spring 170 biases the cup 167 and the ball 168 away from an end 169 of the channel 166, such that the ball 168 sufficiently blocks a vent passage 172 under normal operating tank pressures. When the pressure in the vent passage 172 exceeds a predetermined level, the pressure forces the ball 168 and cup 167 against the bias of the spring 170, thereby allowing fluid to flow by the ball 168 and vent through a port 174 to the atmosphere.

Figure 7:
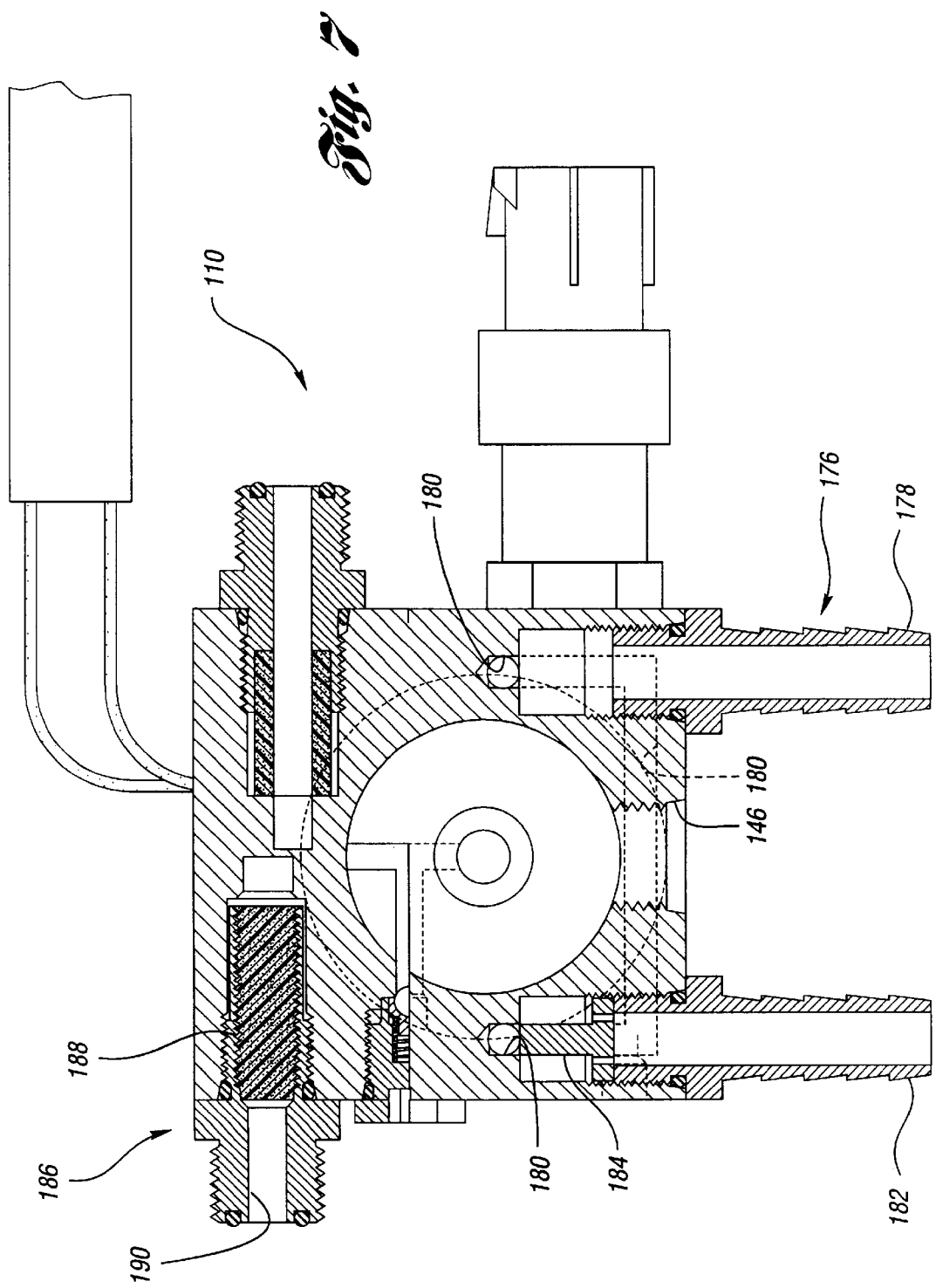
FIG. 7 is sectional view of the pressure regulator of FIG. 3 taken along line 7—7 of FIG. 3 and showing a heating system.

FIG. 7 shows a heating arrangement 176 for sufficiently heating the regulator 110 such that the regulator 110 can function properly when fluid passes through the regulator 110 and out of the outlet 146. For example, the regulator 110 may require heating so as to inhibit formation of hydrate, which is a spongy, ice-like material formed from entrained water and methane that may be present in the fuel. The heating arrangement 176 includes an inlet fitting 178 for receiving a heating fluid, such as vehicle engine coolant, a passageway 180 for routing the heating fluid through the regulator 110, and an outlet fitting 182. A thermostat 184 is preferably mounted proximate the outlet fitting 182, or combined with the outlet fitting 182, for sensing temperature of the heating fluid. The thermostat 184 allows the heating fluid to flow through the passage 180 if the temperature of the heating fluid is at or below a predetermined temperature of, for example, approximately 170° F. At temperatures above 170° F., the thermostat 184 stops the flow of heating fluid so that the temperature of the regulator 110 will remain at approximately 170° F. or below under normal operating conditions.

As further shown in FIG. 7, the regulator 110 includes a thermal relief assembly 186 for relieving pressure from the regulator 110 if the temperature of the regulator 110 exceeds a predetermined level. The thermal relief assembly 186 includes an embedded eutectic 188 that will melt if the temperature of the regulator 110 exceeds the predetermined level, thereby allowing fluid to vent through a port 190 to the atmosphere. The heating arrangement 176 should therefore be properly calibrated to prevent premature melting of the eutectic 188.

As an alternative to or supplement to the heating arrangement 176, the temperature of the regulator 110 may be controlled by heat transfer between the regulator 110 and the tank 112. The tank 112, with its relatively large surface area and mass compared with the regulator 110, acts as a heat source. If the tank 112 is positioned beneath a vehicle, the tank 112 may also gain heat from roadways and/or a vehicle exhaust system. As shown in FIGS. 4 through 6, a relatively large portion of the exterior surface of the block 120 is adapted to engage the neck 113 of the tank 112, such that heat transfer between the regulator 110 and the tank 112 can readily occur. Furthermore, the regulator 110 is preferably configured such that the area of maximum heat loss, which is the area generally around the chamber 151 (the pressure reduction point), is positioned roughly in the middle of the neck 113 of the tank 112 when the regulator 110 is mounted to the tank 112. With such a configuration, the heat transfer path between the chamber 151 and the neck 113 is minimized. In addition, the block 120 is preferably made of aluminum or other heat conductive material to maximize heat transfer between the regulator 110 and the tank 112.

Advantageously, heat transfer between the regulator 110 and the tank 112 may be sufficient to control the temperature of the regulator 110 such that flow of heating fluid through the heating arrangement 176 may be significantly reduced or eliminated. For example, heat transfer between the tank 112 and the regulator 110 may be sufficient to maintain the temperature of the regulator 110 in the range of 30–50° F., which is sufficient to inhibit hydrate formation. Furthermore, such a temperature range is also beneficial for the eutectic 188, which may be made of materials prone to creep at higher temperatures.

Figure 8:
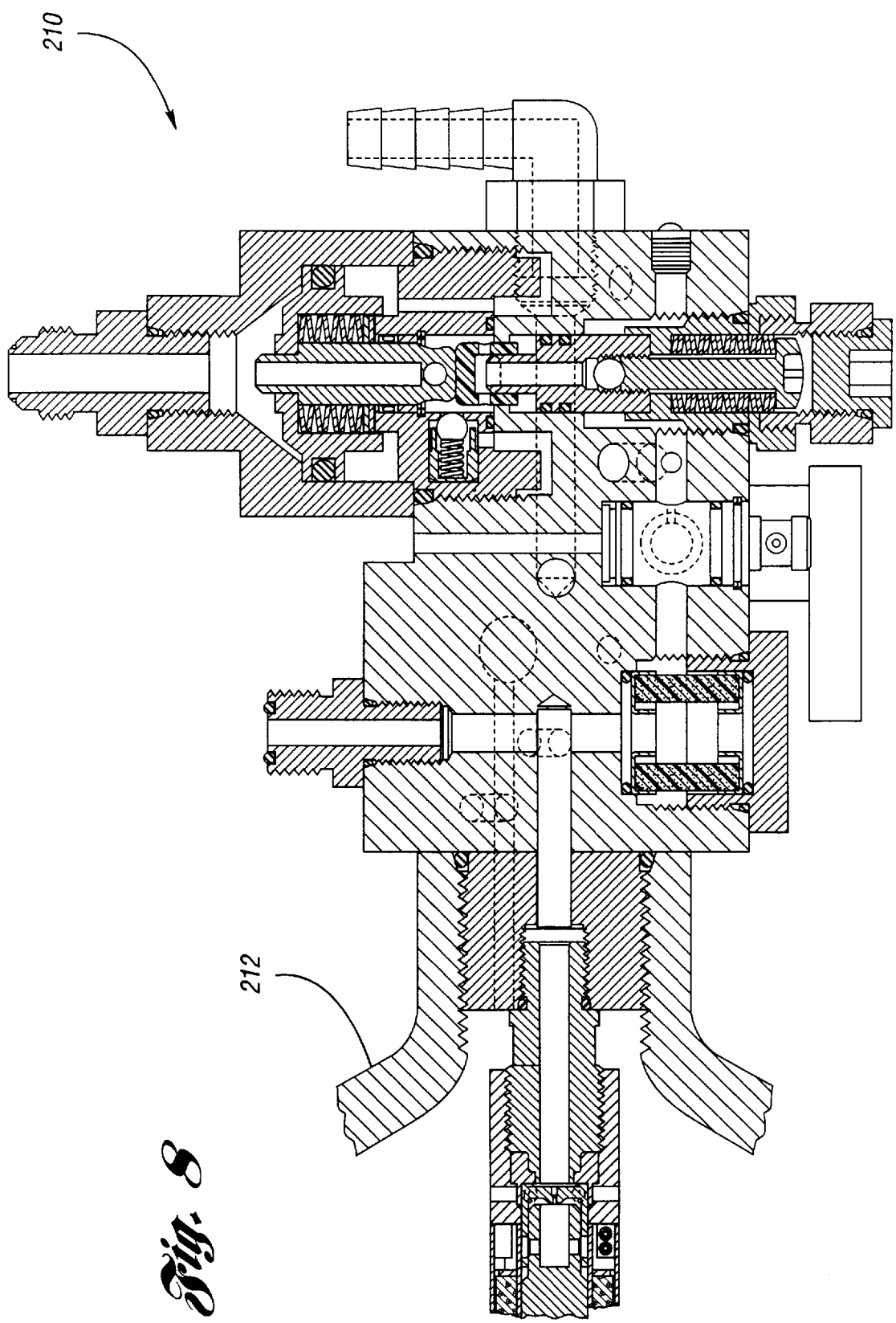
FIG. 8 is a side cross-sectional view of a third embodiment of the pressure regulator.

FIG. 8 shows a third embodiment 210 of the pressure regulator mounted to a tank 212. The pressure regulator 210 comprises similar components as the regulator 110, and functions in a manner similar to the regulator 110. The components of the regulator 210, however, are configured such that the regulator 210 may be disposed entirely outside of the tank 212. As a result, the regulator 210 may be used with tanks having relatively small outlet openings. Similar to the regulator 110, the regulator 210 can be combined with other pressurized functions in a single manifold to reduce the system cost. Examples of what may be added to the regulator 210 in a single manifold either individually, or in any combination, include a high pressure solenoid, a low pressure solenoid, a fuel pressure transducer or indicator, a one quarter turn valve (or shut off valve), an in-line filter, and a refueling receptacle.

It should be understood that while the forms of the invention shown and described above constitute preferred embodiments of the invention, they are not intended to illustrate all possible forms thereof. For instance, while the embodiments shown are adapted to be mounted partially inside a tank or entirely outside a tank, the regulator can also be mounted mostly or entirely inside a tank, or partially or mostly outside a tank. Furthermore, the regulator may be mounted downstream of a tank. It should also be understood that the words used are words of description rather than limitation, and various changes may be made without departing from the spirit and scope of the invention disclosed.

What is claimed is:

1. A regulator for regulating outlet pressure of a fluid contained in a tank, comprising:
   a body having an axis;
   a first piston disposed in the body and having an end and a first bore, the first piston being movable in response to pressure in the tank when exposed to the pressure in the tank; and a second piston disposed in the body and having an end and a second bore, the second piston being movable toward and away from the end of the first piston in response to the outlet pressure;

the ends of the first and second pistons being separated by a first distance to allow the fluid to flow out of the tank, through the first bore and then through the second bore, and the ends of the first and second pistons being positioned closer together than the first distance to inhibit flow out of the tank when the outlet pressure reaches a threshold;

wherein the pistons have a common axis that is offset from the axis of the body.

2. The regulator of claim 1 further comprising a first spring cooperating with the first piston to bias the first piston in a first direction away from the end of the second piston.

3. The regulator of claim 2 further comprising a second spring cooperating with the second piston to bias the second piston in a second direction away from the end of the first piston.

4. The regulator of claim 1 further comprising an adjustment ring disposed around one piston and rotatable with respect to the body and the one piston, the adjustment ring cooperating with the one piston so as to adjust the outlet pressure.

5. The regulator of claim 1 wherein the second piston further includes a radially extending passage in fluid communication with the second bore and configured to divert the fluid at an angle to a direction defined by the second bore, wherein when the ends of the first and second pistons are separated by the first distance, the fluid may flow through the second bore and then through the radially extending passage.

6. The regulator of claim 1 wherein the second piston further includes an extension configured to be exposed to the fluid passing through the second bore such that the fluid contributes a force tending to separate the ends of the first and second pistons.

7. The regulator of claim 3 further comprising a tower defining a chamber into which fluid may pass from the first piston.

8. The regulator of claim 7 wherein the tower normally mates with a surface, the tower separating from the surface when the pressure in the chamber exceeds a predetermined level.

9. The regulator of claim 1 further comprising a tower normally mating with a surface and defining a chamber into which fluid from the tank may pass, the tower separating from the surface when the pressure in the chamber exceeds a predetermined level.

10. The regulator of claim 3 wherein the first direction is axially opposite from the second direction.

11. The regulator of claim 1 wherein the first and second ends engage each other to inhibit flow out of the tank when the outlet pressure reaches the threshold.

12. The regulator of claim 1 further comprising a seat having an opening through which the fluid may pass and being movably associated with one piston such that the seat is axially moveable with respect to and along an outer surface of an axially extending portion of the one piston, the seat being movable between an unseated position for allowing fluid to flow out of the tank and through the opening when the pistons are separated by the first distance, and a seated position for inhibiting flow out of the tank when the outlet pressure reaches the threshold.

13. The regulator of claim 1 further comprising a vent passage into which fluid from the tank may flow, and a valve assembly including a ball that is normally biased into the vent passage so as to inhibit flow through the vent passage, the ball being movable against the bias when the pressure in a portion of the vent passage exceeds a predetermined level.

14. The regulator of claim 1 wherein the body is adapted to engage the tank and is made of a heat conductive material to facilitate heat transfer between the tank and the regulator.

15. A regulator for regulating outlet pressure of a fluid contained in a tank, comprising:

a first piston having an end and a first bore through which the fluid may pass;

a first spring for biasing the first piston in a first, axial direction, the piston being movable against the bias when exposed to pressure in the tank;

a second piston having an end and a second bore through which the fluid may pass;

a second spring for biasing the second piston in a second direction opposite from the first direction and away from the end of the first piston, the second piston being movable against the bias when exposed to the outlet pressure; and a seat engageable with one piston and movably associated with the other piston such that the seat is axially movable with respect to and along an outer surface of an axially extending portion of the other piston, the seat having an opening through which the fluid may flow so that the fluid may pass from the first bore to the second bore, the seat being movable between an unseated position for allowing the fluid to flow through the opening and a seated position for inhibiting flow through the opening;

the ends of the first and second pistons being separated by a first distance such that the seat is in the unseated position to allow the fluid to flow out of the tank, and the ends of the first and second pistons being positioned closer together than the first distance such that the seat is in the seated position to inhibit flow out of the tank when the outlet pressure reaches a threshold.

16. The regulator of claim 15 further comprising a radially extending passage in fluid communication with the second bore and configured to divert the fluid at an angle to a direction defined by the second bore, wherein when the ends of the first and second pistons are separated by the first distance, the fluid may flow out of the tank, through the bores and then through the radially extending passage.

17. The regulator of claim 16 wherein the radially extending passage is configured to divert the fluid at an angle greater than ninety degrees to the direction defined by the second bore.

18. The regulator of claim 15 further comprising a tower defining a chamber into which fluid may pass from the first piston.

19. The regulator of claim 18 wherein the tower normally mates with a surface, the tower separating from the surface when the pressure in the chamber exceeds a predetermined level.

20. The regulator of claim 15 further comprising an adjustment ring disposed around one piston and rotatable with respect to the one piston, the adjustment ring cooperating with the one piston to adjust the outlet pressure, wherein rotation of the adjustment ring in one direction increases the outlet pressure, and rotation of the adjustment ring in an opposite direction decreases the outlet pressure.

21. The regulator of claim 15 further comprising a tower normally mating with a surface and defining a chamber into which fluid from the tank may pass, the tower separating from the surface when the pressure in the chamber exceeds a predetermined level.

22. The regulator of claim 15 further compromising a vent passage into which fluid from the tank may flow, and a valve assembly including a ball that is normally biased into the vent passage so as to inhibit flow through the vent passage, the ball being movable against the bias when the pressure in a portion of the vent passage exceeds a predetermined level.

23. A regulator for regulating outlet pressure of natural gas contained in a tank, comprising:
   a body having an axis;
   a first piston disposed in the body, the first piston having an end and a first bore through which the natural gas may pass;
   a first spring for biasing the first piston in a first, axial direction, the piston being movable against the bias when exposed to pressure in the tank;
   a second piston disposed in the body, the second piston having an end and a second bore through which the natural gas may pass; and
   a second spring for biasing the second piston in a second direction opposite from the first direction and away from the end of the first piston, the second piston being movable against the bias when exposed to the outlet pressure;
   the ends of the first and second pistons being separated by a first distance to allow the natural gas to flow out of the tank, through the first bore and then through the second bore, and the ends of the first and second pistons being positioned closer together than the first distance to inhibit flow out of the tank when the outlet pressure reaches a threshold;
   wherein the pistons have a common axis parallel to and offset from the axis of the body.

24. The regulator of claim 23 wherein the second piston further includes a radially extending passage in fluid communication with the second bore and configured to divert the natural gas at an angle to a direction defined by the second bore, wherein when the ends of the first and second pistons are separated by the first distance, the natural gas may flow through the second bore and then through the radially extending passage.

25. The regulator of claim 23 wherein the second piston further includes an extension configured to be exposed to the natural gas passing through the second bore such that the natural gas contributes a force tending to separate the ends of the first and second pistons.

26. The regulator of claim 23 further comprising a tower disposed in the body and defining a chamber into which natural gas may pass from the first piston.

27. The regulator of claim 26 wherein the tower normally mates with a surface of the body, the tower separating from the surface when the pressure in the chamber exceeds a predetermined level.

28. The regulator of claim 23 further comprising an adjustment ring disposed around one piston and rotatable with respect to the body and the one piston, the adjustment ring cooperating with the one piston to adjust the outlet pressure, wherein rotation of the adjustment ring in one direction increases the outlet pressure, and rotation of the adjustment ring in an opposite direction decreases the outlet pressure.

29. The regulator of claim 23 further comprising a tower disposed in the body and normally mating with a surface of the body, the tower defining a chamber into which natural gas from the tank may pass, the tower separating from the surface when the pressure in the chamber exceeds a predetermined level.

30. The regulator of claim 23 further comprising a vent passage into which natural gas from the tank may flow, and a valve assembly including a ball that is normally biased into the vent passage so as to inhibit flow through the vent passage, the ball being movable against the bias when the pressure in a portion of the vent passage exceeds a predetermined level.

31. The regulator of claim 1 further comprising a seat attached to one piston and engageable with the other piston.

32. The regulator of claim 4 wherein the adjustment ring is disposed in the body, and wherein the regulator further includes a tower defining a chamber into which fluid from the first piston may pass, and an engaging member moveably associated with the adjustment ring and engageable with the tower so as to inhibit rotation of the adjustment ring.

33. The regulator of claim 5 wherein the radially extending passage is configured to divert the fluid at an angle greater than ninety degrees to the direction defined by the bore.

34. The regulator of claim 20 wherein the adjustment ring is disposed in the body and further includes a channel, and wherein the regulator further includes a tower defining a chamber into which fluid from the first piston may pass, and an engaging member extending from the channel and engageable with the tower so as to inhibit rotation of the adjustment ring.

35. A regulator for regulating outlet pressure of a fluid contained in a tank, the regulator comprising:
   a body having an outlet;
   a first piston disposed in the body and having an end and a first bore through which the fluid may pass, the first piston being movable in response to pressure in the tank when exposed to the pressure in the tank; and
   a second piston disposed in the body and having an end, a second bore in fluid communication with the first bore, and a radially extending passage in fluid communication with the second bore and the outlet for diverting the fluid at an angle to a direction defined by the second bore, the second piston being movable toward and away from the end of the first piston in response to the outlet pressure;
   the ends of the first and second pistons being separated by a first distance to allow the fluid to flow out of the tank, through the bores and then through the radially extending passage and the ends of the first and second pistons being positioned closer together than the first distance to inhibit flow out of the tank when the outlet pressure reaches a threshold.

* * * * *